Figure 1:
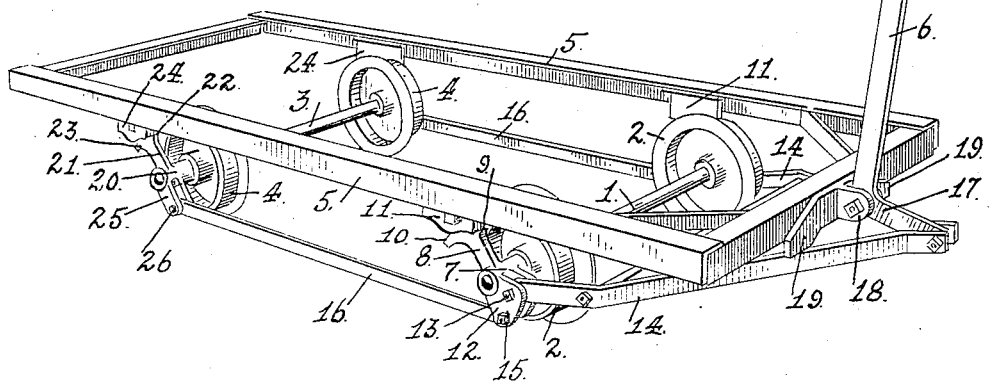

J. PORTEOUS.
ADJUSTABLE TRUCK.
APPLICATION FILED AUG. 9, 1910.

979,093.

Patented Dec. 20, 1910.

Witnesses:
Arthur L. Slee.
S. Constine.

Inventor
James Porteous
by Wm. F. Booth
his Attorney

UNITED STATES PATENT OFFICE.

JAMES PORTEOUS, OF FRESNO, CALIFORNIA.

ADJUSTABLE TRUCK.

979,093.

Specification of Letters Patent.  Patented Dec. 20, 1910.

Application filed August 9, 1910. Serial No. 576,334.

*To all whom it may concern:*

Be it known that I, JAMES PORTEOUS, a citizen of the United States, residing at Fresno, in the county of Fresno and State of California, have invented certain new and useful Improvements in Adjustable Trucks, of which the following is a specification.

My invention relates to that class of trucks in which the body and wheeled axles are so related by a crank connection that by the movement of the truck handle the body may be raised and lowered. These trucks are commonly employed in transferring trays of fruit, which being piled upon cleats at one station of any particular process to which the fruit is being subjected, have to be taken to another station. This transfer is effected by lowering the truck body and running it under the tray pile; then raising the body up under this pile thereby lifting the trays from the cleats and supporting them on the truck; and thereupon running the truck over to the other station and by depressing the body, lowering the tray pile upon supporting cleats; and finally withdrawing the truck.

In trucks of this type the crank connections by which the vertical movement of the body is affected are operated by the handle of the truck and it is customary to so connect the handle by its bell-crank and yoke directly to the front axle that under the movement of the handle up or down, the front axle is bodily moved forward or back relatively to the body, which movement through crank connections between the axle and body causes the vertical movement of the latter. It is also customary to locate the pressure connection or the handle yoke with the axle at points inside the wheels, the crank connections being outside; and in order to make the front and rear axles act in unison, they are connected by bars in which the axles are journaled, said bars lying also inside the wheels. The front axle is thus journaled in both the yoke end and the forward ends of the connecting bars and the rear axle is journaled in the rear ends of said bars.

The handle of the truck in addition to its use as a lever to vertically adjust the body is also used to move the truck along its tracks. In this latter use, it is often found that the pressure on the handle will cause a binding of the axles, in their several journals, the axles in these trucks being rotary ones with the wheel fast upon them. This binding is due both to the direct journal connection of the handle yoke with the front axle and to the journal bearings of the bars connecting directly the two axles, and the result is that the truck is either hard to propel or will not move at all.

The object of my invention is to provide an adjustable truck of this general type in which the connections are such that under the propelling pressure of the handle there will be no binding of the axles and the truck will move freely and easily under all circumstances.

My invention consists in the novel construction and arrangement of parts which I shall now fully describe and claim, reference being had to the accompanying drawings in which—

Figure 2:
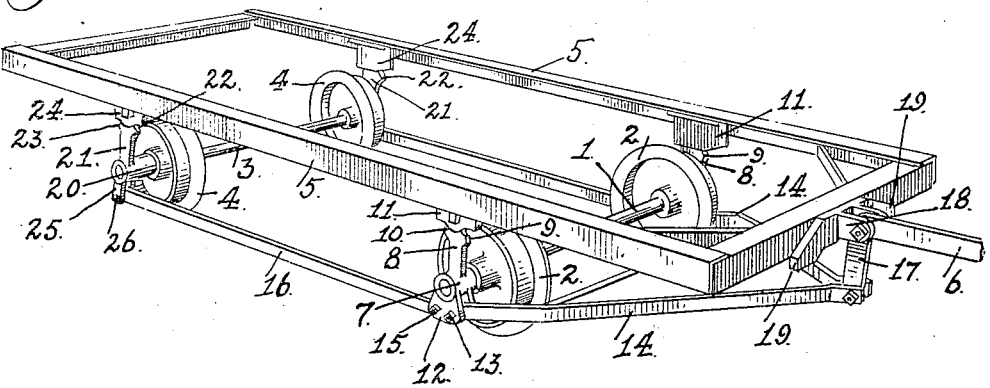

Figure 1 is a view of my truck with the body lowered. Fig. 2 is a view of the same, the body being raised.

1 is the front axle, and 2 are the front wheels fast on the front axle.

3 is the rear axle, and 4 are the rear wheels also fast on their axle.

5 is the truck body and 6 is its handle.

Pivoted upon the projecting ends of the front axle, outside of the wheels, one at each end of said axle, is a crank lever 7, the upper arm 8 of which has the forward stop 9 and the rear stop 10, and said arm is pivoted in a lug 11 bolted up under the side bar of the body 5. The lower arm 12 of this crank lever 7 is, preferably bifurcated and is provided with two holes, one to receive at 13 the pivotal connection of the handle yoke 14, and the other to receive at 15 the pivotal connection of the forward end of the connecting bars 16.

The handle 6 has a bell-crank end at 17 which is pivoted at its angle in a lug 18 on the front of the body 5. To this bell-crank end of the handle is connected the forward end of the yoke 14.

19 are stops for the yoke on the front of the body.

Pivoted upon the projecting ends of the rear axle beyond the wheels, one at each end is the crank-lever 20, the upper arm 21 of which has the forward stop 22 and the rear stop 23, and said arm is pivoted in a lug 24 bolted up under the body 5. The lower arm 25 of the crank lever 20 has pivotally connected to it at 26 the rear end of the connecting bar 16.

As is shown in Fig. 1, when the handle is lifted, the crank levers 7 and 20 are thrown to lower the body 5, and as shown in Fig. 2 the pulling down of the handle, throws the levers 7 and 20 to raise the body 5. These movements are effected easily, and when the handle is used to propel the truck there is no binding of the axles, as neither the handle yoke nor the connecting bars have any direct journal on the axles, the latter being free of all bearings except those by which the crank levers are pivoted upon them.

Having thus described my invention what I claim as new and desire to secure by Letters Patent is—

1. An adjustable truck consisting of forward and rear wheeled axles; a body; crank-levers pivoted on the axles, and pivotally connected by their upper arms to the body, said upper arms being formed with a forward stop and a rear stop coacting with the body; connecting bars pivotally connecting the lower arms of the forward and rear crank levers on each side to effect their operation in unison; a handle for the truck having a crank-end pivoted to the front of the body; and a yoke pivoted at its forward end to the crank end of the handle and at its rear ends pivotally connected to the lower arms of the crank-levers of the front axle.

2. An adjustable truck consisting of forward and rear wheeled axles; a body; crank-levers pivoted on the projecting ends of the axles outside of the wheels, and pivotally connected by their upper arms to the body; connecting bars pivotally connecting the lower arms of the forward and rear crank-levers outside the wheels on each side to effect their operation in unison; a handle for the truck having a crank end pivoted to the front of the body; and a yoke pivoted at its forward end to the crank-end of the handle and at its rear ends pivotally connected outside the wheels to the lower arms of the crank levers of the front axle.

In testimony whereof I have signed my name to this specification in the presence of two subscribing witnesses.

JAMES PORTEOUS.

Witnesses:
MILTON M. DEARING,
A. H. McKENZIE.